US008645463B2

(12) United States Patent
Knight et al.

(10) Patent No.: US 8,645,463 B2
(45) Date of Patent: Feb. 4, 2014

(54) METHODS AND APPARATUSES FOR MANAGING RESOURCES WITHIN A VIRTUAL ROOM

(75) Inventors: David Knight, Belmont, CA (US); Christopher Daniels, San Jose, CA (US); Steffen Matt, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 780 days.

(21) Appl. No.: 11/549,562

(22) Filed: Oct. 13, 2006

(65) Prior Publication Data

US 2008/0075118 A1  Mar. 27, 2008

Related U.S. Application Data

(60) Provisional application No. 60/826,881, filed on Sep. 25, 2006.

(51) Int. Cl.
*G06F 15/16* (2006.01)

(52) U.S. Cl.
USPC ........... 709/204; 709/205; 709/225; 713/193; 345/751

(58) Field of Classification Search
USPC .......................... 709/204–207; 370/260–267; 715/733–759
See application file for complete search history.

(56) References Cited

U.S. PATENT DOCUMENTS

| | | | | |
|---|---|---|---|---|
| 6,029,161 | A * | 2/2000 | Lang et al. ............................. | 1/1 |
| 6,496,822 | B2 * | 12/2002 | Rosenfelt et al. ..................... | 1/1 |
| 6,501,380 | B1 * | 12/2002 | Jakobsson ...................... | 340/571 |
| 6,519,571 | B1 * | 2/2003 | Guheen et al. .................. | 705/14 |
| 6,658,419 | B2 * | 12/2003 | Pasquali ........................ | 715/781 |
| 6,714,791 | B2 * | 3/2004 | Friedman .................... | 455/456.1 |
| 6,732,148 | B1 * | 5/2004 | Estrada et al. ................ | 709/205 |
| 7,124,164 | B1 * | 10/2006 | Chemtob ...................... | 709/204 |
| 2001/0055963 | A1 * | 12/2001 | Cloutier ........................ | 455/417 |
| 2002/0177433 | A1 * | 11/2002 | Bravo et al. .................... | 455/411 |
| 2002/0184509 | A1 * | 12/2002 | Scheidt et al. ................ | 713/185 |
| 2003/0009525 | A1 * | 1/2003 | Yasue ........................... | 709/205 |
| 2003/0065721 | A1 | 4/2003 | Roskind | |
| 2003/0076353 | A1 * | 4/2003 | blackstock et al. ............ | 345/751 |

(Continued)

FOREIGN PATENT DOCUMENTS

| | | |
|---|---|---|
| WO | WO 0118633 A1 * | 3/2001 |
| WO | WO 03010620 A2 * | 2/2003 |
| WO | WO-03/030003 A1 | 4/2003 |

OTHER PUBLICATIONS

WebEx Communications, Inc., PCT Notification of Transmittal of the International Search Report and the Written Opinion of the International Searching Authority, or the Declaration, International Filing date: Sep. 25, 2007, International Filing No. PCT/US07/79459, Date of Document mailing: Mar. 14, 2008, 9 pages.

(Continued)

*Primary Examiner* — Andrew Goldberg (57) ABSTRACT

In one embodiment, the methods and apparatuses display a list configured to represent a plurality of virtual rooms; identify a selected participant device associated with a selected virtual room from the plurality of virtual rooms wherein the selected participant device is a member of the selected virtual room; selectively display content associated with the selected virtual room to the selected participant device; and notify the selected participant device of a change to the content associated with the selected virtual room.

21 Claims, 9 Drawing Sheets

(56) References Cited

U.S. PATENT DOCUMENTS

| | | |
|---|---|---|
| 2003/0131073 A1* | 7/2003 | Lucovsky et al. ............. 709/219 |
| 2003/0134615 A1* | 7/2003 | Takeuchi ...................... 455/411 |
| 2004/0093290 A1* | 5/2004 | Doss et al. ...................... 705/35 |
| 2004/0103153 A1 | 5/2004 | Chang et al. |
| 2004/0125933 A1* | 7/2004 | Jun et al. .................. 379/202.01 |
| 2004/0139338 A1* | 7/2004 | Ohmori et al. ................ 713/193 |
| 2004/0221037 A1* | 11/2004 | Costa-Requena et al. .... 709/225 |
| 2004/0260770 A1* | 12/2004 | Medlin et al. ................. 709/204 |
| 2005/0165859 A1* | 7/2005 | Geyer et al. ................... 707/201 |
| 2006/0063552 A1* | 3/2006 | Tillet et al. .................... 455/519 |
| 2006/0079973 A1* | 4/2006 | Bacharach ...................... 700/91 |
| 2006/0193474 A1* | 8/2006 | Fransdonk .................... 380/279 |
| 2006/0242574 A1* | 10/2006 | Richardson et al. .......... 715/530 |
| 2008/0004886 A1* | 1/2008 | Hames et al. ..................... 705/1 |
| 2008/0010361 A1* | 1/2008 | Jacobs et al. .................. 709/218 |
| 2008/0026826 A1* | 1/2008 | Groswirt ......................... 463/25 |

OTHER PUBLICATIONS

U.S. Appl. No. 60/826,881, filed Sep. 25, 2006, for Methods and Apparatuses for Managing Resources Within a Virtual Room, by David Knight et al., 27 pages.

* cited by examiner

METHODS AND APPARATUSES FOR MANAGING RESOURCES WITHIN A VIRTUAL ROOM

CROSS REFERENCE TO RELATED APPLICATION

This application claims the benefit of U.S. Provisional Application Ser. No. 60/826,881 filed Sep. 25, 2006, which application is incorporated herein by reference.

FIELD OF INVENTION

The present invention relates generally to managing resources and, more particularly, to managing resources within a virtual room.

BACKGROUND

There has been an increased use in both instant messaging (IM) session and electronic collaboration sessions. IM sessions and electronic collaboration sessions are utilized to communicate with employees, vendors, and clients. During these IM sessions and collaboration sessions, information is typically exchanged between the participants. This exchanged information may include audio, graphical, and/or textual information.

The IM sessions and collaboration sessions can occur spontaneously or can be scheduled. In both cases, an initiator participant is utilized to notify the other participants.

SUMMARY

In one embodiment, the methods and apparatuses display a list configured to represent a plurality of virtual rooms; identify a selected participant device associated with a selected virtual room from the plurality of virtual rooms wherein the selected participant device is a member of the selected virtual room; selectively display content associated with the selected virtual room to the selected participant device; and notify the selected participant device of a change to the content associated with the selected virtual room.

BRIEF DESCRIPTION OF THE DRAWINGS

The accompanying drawings, which are incorporated in and constitute a part of this specification, illustrate and explain one embodiment of the methods and apparatuses for managing resources within a virtual room.
In the drawings.

FIG. 8 is a screen shot consistent with one embodiment of the methods and apparatuses for managing resources within a virtual room.

DETAILED DESCRIPTION

The following detailed description of the methods and apparatuses for managing resources within a virtual room refers to the accompanying drawings. The detailed description is not intended to limit the methods and apparatuses for managing resources within a virtual room. Instead, the scope of the methods and apparatuses for managing resources within a virtual room is defined by the appended claims and equivalents. Those skilled in the art will recognize that many other implementations are possible, consistent with the present invention.

References to a participant device include a desktop computer, a portable computer, a personal digital assistant, a video phone, a landline telephone, a cellular telephone, and a device capable of receiving/transmitting an electronic signal.

In one embodiment, the methods and apparatuses for managing resources within a virtual room allow a user operating a participant device to view a list of available virtual rooms. Further, the user is capable of selectively accessing these available virtual rooms. In one embodiment, the user is associated with a corresponding profile that identifies the participant device as a member of the available virtual rooms. Further, the status of each of the available rooms is shown.

In one embodiment, the participant devices have a profile associated with each device. In one embodiment, each of the devices has access rights to the associated virtual rooms. In one embodiment, there are assigned rights that restrict the type of access that is allowed by the participant device. In another embodiment, access to the device is restricted by other factors such as the identity of the user, the particular participant device that the user utilizes to gain access, the number of times the user gains access, and the duration that the user accesses the device.

In another embodiment, each of the virtual rooms has a profile that includes a list of participant devices, access rights, and content associated with the virtual room.

Figure 1:
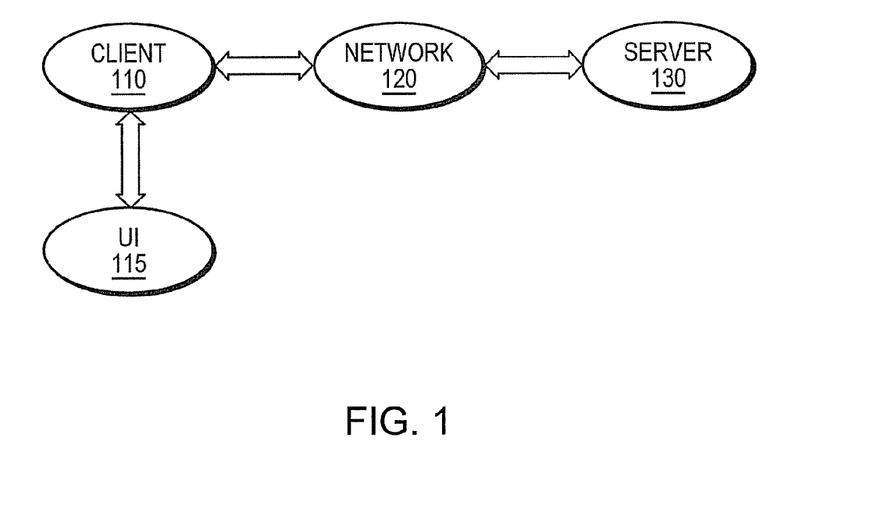
FIG. 1 is a diagram illustrating an environment within which the methods and apparatuses for managing resources within a virtual room are implemented.

FIG. 1 is a diagram illustrating an environment within which the methods and apparatuses for managing resources within a virtual room are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of managing resources within a virtual room below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
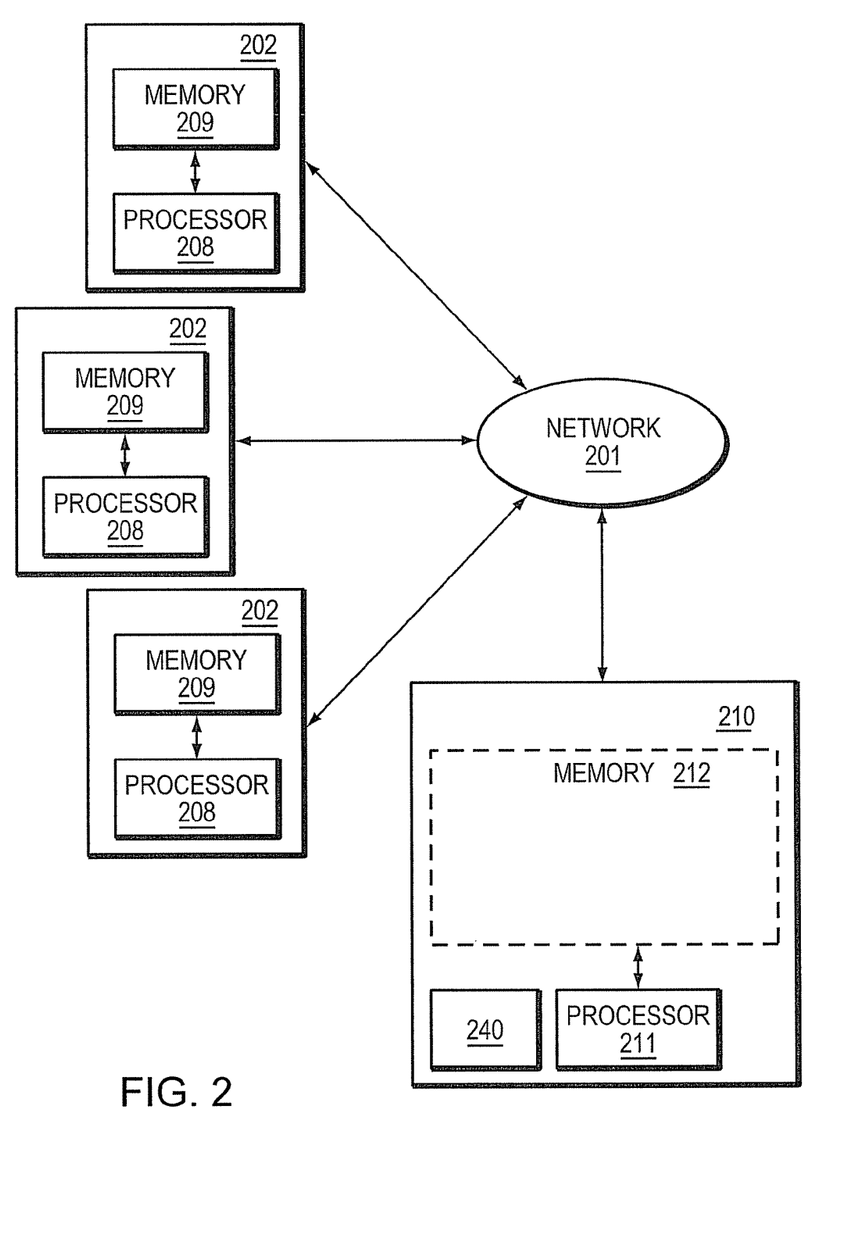
FIG. 2 is a simplified block diagram illustrating one embodiment in which the methods and apparatuses for managing resources within a virtual room are implemented.

FIG. 2 is a simplified diagram illustrating an exemplary architecture in which the methods and apparatuses for managing resources within a virtual room are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 210 includes a processor 211 coupled to a computer-readable medium 212. In one embodiment, the server device 210 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for communicating between messaging and telephony systems. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on managing resources within a virtual room as determined using embodiments described below.

Figure 3:
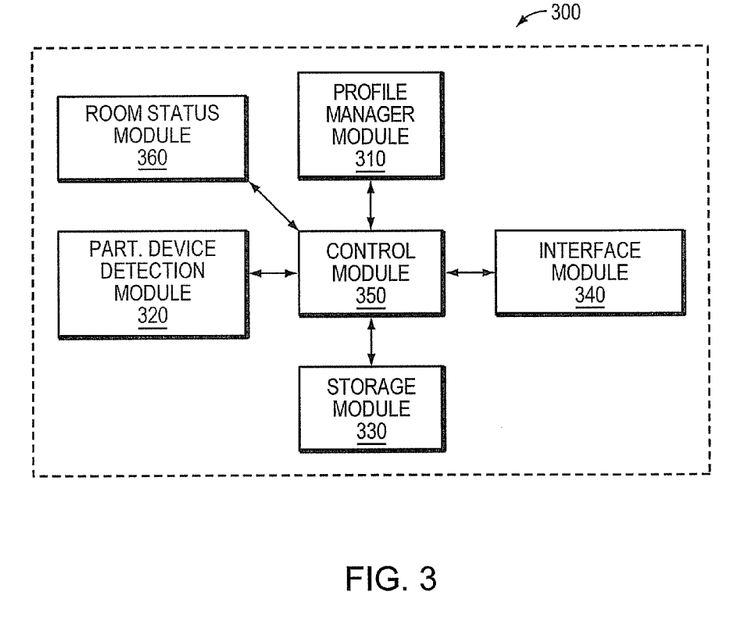
FIG. 3 is a simplified block diagram illustrating a system, consistent with one embodiment of the methods and apparatuses managing resources within a virtual room.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a profile manager module 310, a participant device detection module 320, a storage module 330, an interface module 340, a control module 350, and a room status module 360.

In one embodiment, the control module 350 communicates with the profile manager module 310, the participant device detection module 320, the storage module 330, the interface module 340, the control module 350, and the room status module 360. In one embodiment, the control module 350 coordinates tasks, requests, and communications between the profile manager module 310, the participant device detection module 320, the storage module 330, the interface module 340, the control module 350, and the room status module 360.

In one embodiment, the profile manager module 310 organizes and tracks the profiles. In one embodiment, each profile corresponds to a participant device. In another embodiment, each profile corresponds with a virtual room.

In one embodiment, the participant device detection module 320 detects and identifies the identity of the participant devices. In one embodiment, the participant device detection module 320 detects the identity of devices that are coupled to a network such as an intranet, the Internet, a LAN, a WAN, and the like. The network may include both wired and wireless networks.

In another embodiment, the device detection module 320 also detects the status of the participant device. A participant device status includes being available, busy, logged off, and the like. Further, the participant device may be logged into a particular virtual room.

In one embodiment, the storage module 330 stores a record including a profile associated with the each participant device and/or virtual room. An exemplary profile is shown in a record 400 within FIG. 4.

In one embodiment, the interface module 340 detects input from a user. For example, when a user signs into a profile, the interface module 340 recognizes "friends" or "buddies" of the user from the profile.

In one embodiment, the access module 360 monitors the input from the user through the interface module and selectively allows the user to access other devices based on the profile associated with the user and the profile associated with each device accessed by the user.

The system 300 in FIG. 3 is shown for exemplary purposes and is merely one embodiment of the methods and apparatuses for managing resources within a virtual room. Additional modules may be added to the system 300 without departing from the scope of the methods and apparatuses for managing resources within a virtual room. Similarly, modules may be combined or deleted without departing from the scope of the methods and apparatuses for managing resources within a virtual room.

Figure 4:
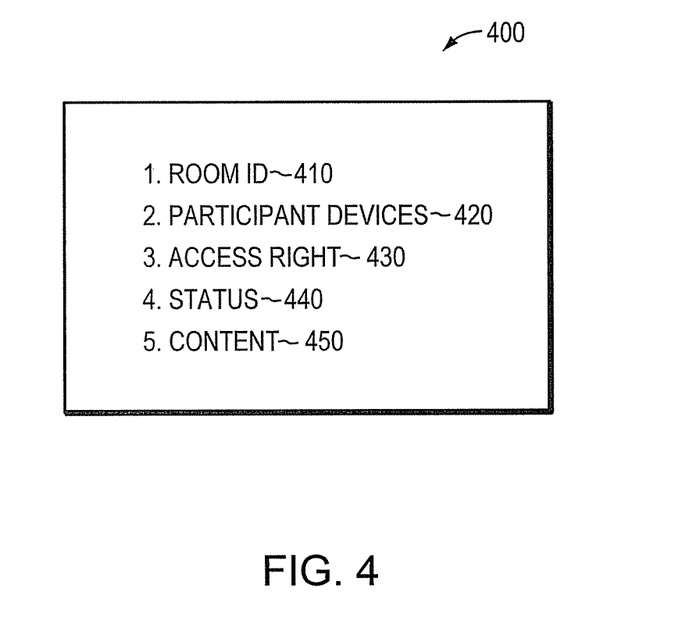
FIG. 4 is an exemplary record for use with the methods and apparatuses for managing resources within a virtual room.

FIG. 4 illustrates an exemplary record 400 for use with the methods and apparatuses for managing resources within a virtual room. In one embodiment, the record 400 illustrates an exemplary record associated with a virtual room.

In one embodiment, there are multiple records such that each record 400 is associated with a particular virtual room. Further, each virtual room may be associated with multiple participant devices. In one embodiment, each record 400 is also associated with a particular virtual room.

In one embodiment, the record 400 includes a virtual room identification field 410, a participant devices field 420, an access rights field 430, a status field 440, and a content field 450. In one embodiment, the record 400 resides within the client 110. In another embodiment, the record 400 resides within the server 130.

In one embodiment, the virtual room identification field 410 includes information related to the virtual room. In one embodiment, the participant identification field 410 identifies a controlling participant device that has all access rights and privileges to the virtual room. The controlling participant device may be identified through an IM identifier associated with the user or a password. In another embodiment, controlling participant device is identified through a serial number associated with the device.

In one embodiment, the participant devices field 420 includes a listing of friends or buddies that is associated with the particular profile. For example, if the profile is associated with a particular user, then the listing of friends indicates devices or other users that are associated with the particular user. In some instances, these devices and/or users are included within a particular virtual room.

In one embodiment, the access rights field 430 designates the type of access and control the participant device has within the virtual room. For example, some participant devices may be limited to exchanging messages. In another example, some participant devices may be limited to viewing documents or content within the virtual room but not be allowed to modify or add content to the virtual room.

In one embodiment, the type of access and control rights include viewing content, downloading content, changing configurations, deleting content, adding content, deleting applications, adding applications, modifying applications, and the like.

In one embodiment, the status field 440 allows a particular device or particular user that is listed within the participant devices field 420 to have a current status associated with that entity. For example, the status is detected through the participant device detection module 320. The status includes being available, busy, in a meeting, out to lunch, away from my desk, idle, unavailable, and the like. Further, the status also includes whether the participant device is logged into or absent from the virtual room.

In one embodiment, the content field 450 includes content such as documents, web pages, electronic messages, and IM chat to be referenced and stored. Further, the content is associated with a particular virtual room for use by the participant devices associated with the virtual room.

Figure 5:
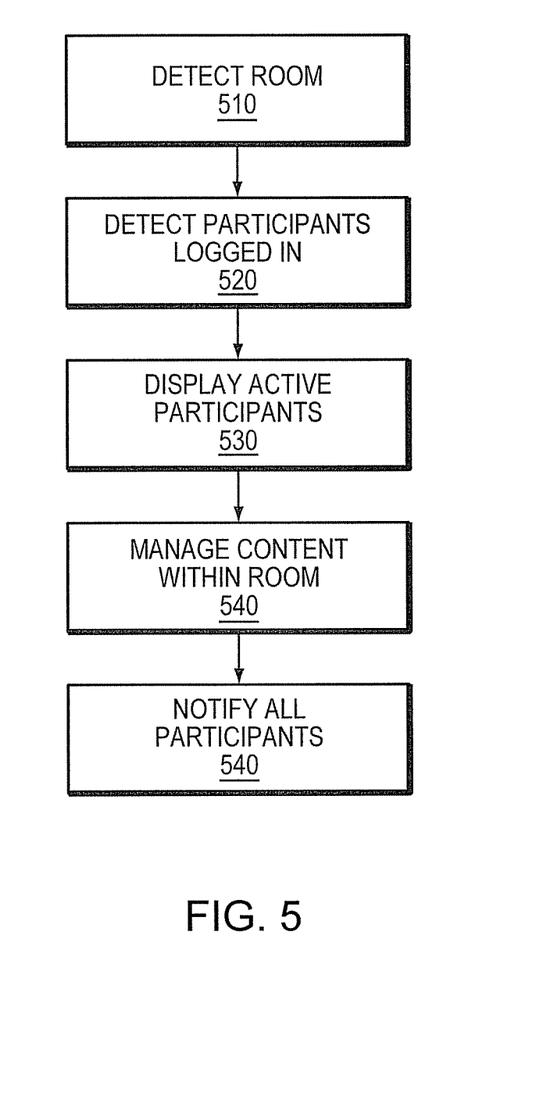
FIG. 5 is a flow diagram consistent with one embodiment of the methods and apparatuses for managing resources within a virtual room.
Figure 6:
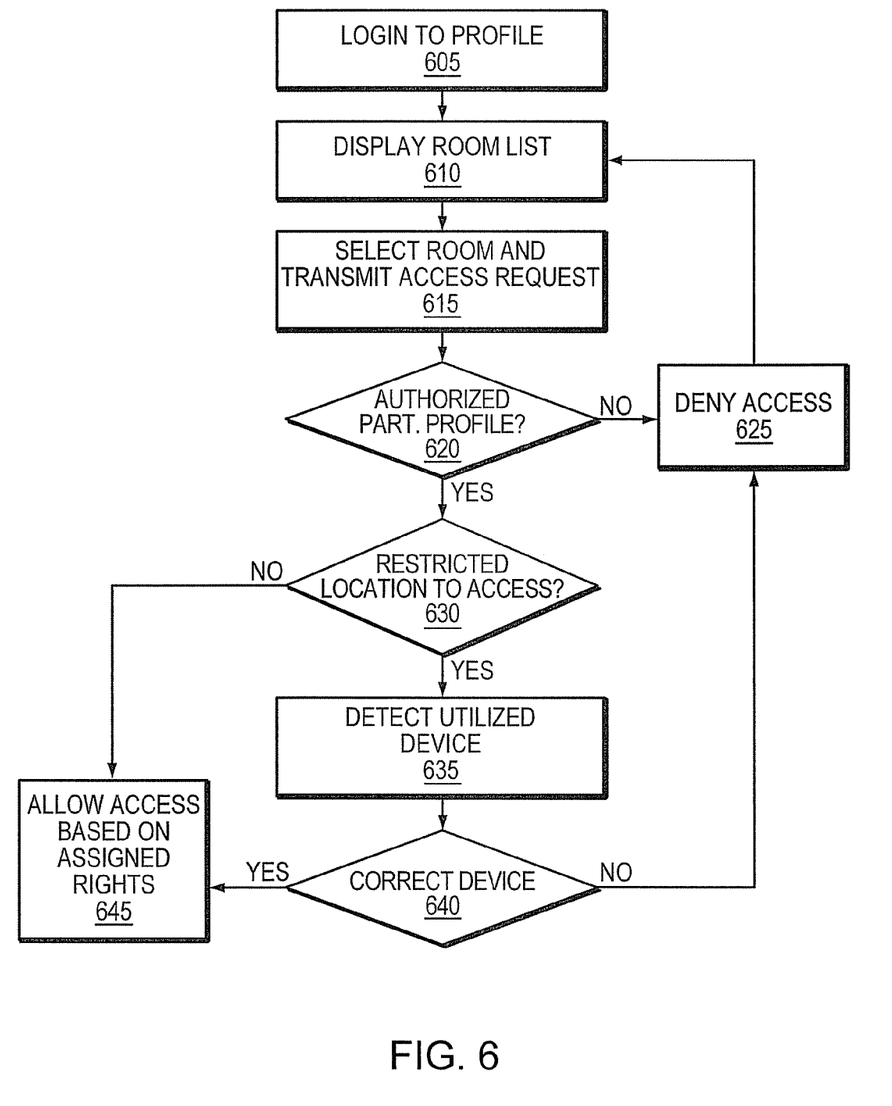
FIG. 6 is a flow diagram consistent with one embodiment of the methods and apparatuses for managing resources within a virtual room.

The flow diagrams as depicted in FIGS. 5 and 6 are one embodiment of the methods and apparatuses for managing resources within a virtual room. The blocks within the flow diagrams can be performed in a different sequence without departing from the spirit of the methods and apparatuses for managing resources within a virtual room. Further, blocks can be deleted, added, or combined without departing from the spirit of the methods and apparatuses for managing resources within a virtual room.

The flow diagram in FIG. 5 illustrates managing a virtual room according to one embodiment of the invention.

In Block 510, a virtual room is detected. In one embodiment, a participant device is identified through a login identification that uniquely identifies that individual user. In another embodiment, the participant device utilizes a password in conjunction with the login identification to authenticate the user as an authorized party.

In Block 520, participant devices are identified within the selected virtual room.

In Block 530, the participant devices that are logged into the virtual room are identified and displayed within the virtual room.

In Block 540, content associated with the virtual room is managed. In one embodiment, content within the virtual room that is new, modified or deleted is monitored and the participant devices are notified of the changes, additions, or deletions. The content may include documents, messages, calendar entries, and the like.

In Block 550, the participant devices are notified of the content additions, modifications, or deletions. In one embodiment, if the participant device is logged into the virtual room, the particular participant device is notified of the content change via a message through instant messenger (IM). In another embodiment, if the participant device is logged out of the virtual room, the particular participant device is notified of the content change via a message through instant messenger (IM) and an electronic mail message.

The flow diagram in FIG. 6 illustrates accessing a virtual room according to one embodiment of the invention.

In Block 605, a user accesses a user profile associated with the user. In one embodiment, the user identifies the user profile through a login identification. Further, the user authenticates authorization to the user profile by providing a predetermined password associated with the user profile. In one embodiment, the user may be associated with multiple user profiles.

In Block 610, a virtual room list is displayed. In one embodiment, the virtual room list includes virtual rooms that are available to be viewed by the user through the user profile.

In one embodiment, the status of the virtual rooms is shown through the virtual room list and represents whether each virtual room is available, unavailable, and the like. In another embodiment, the status of the participant devices that are associated with the particular virtual room are also shown through the virtual room list.

In Block 615, a selected virtual room shown within the device list is selected and an access request is transmitted. In one embodiment, the participant device associated with the profile chooses the selected virtual room. Further, the participant device associated with the profile transmits the access request to gain access to the selected virtual room.

In Block 620, a determination is made regarding whether the profile associated with the participant device is authorized to access the selected virtual room. In one embodiment, a check is performed to ensure that the profile associated with the participant device is authorized to access the selected virtual room. In one embodiment, the selected virtual room includes an associated profile that lists the authorized profiles associated with participant devices that are allowed to access this selected virtual room.

In one embodiment, the participant device is asked to verify the passwords associated with the profile prior to gaining access to the selected virtual room.

If the profile associated with the participant device is not authorized to access the selected virtual room, then access to the selected device is denied in Block 625. In one embodiment, when access is denied to the selected virtual room, information is not exchanged between the participant device associated with the profile and the selected virtual room.

After access is denied in the Block 625, the virtual room list is displayed in the Block 610.

If the profile associated with the participant device is authorized to access the selected virtual room, then access that is restricted based on the location of the participant device associated with the profile is checked in Block 630.

If access to the selected device is not restricted based on the location of the participant device associated with the profile, then access to the selected virtual room is granted to the participant device in Block 645. In one embodiment, access to the selected virtual room by the participant device is restricted based on the assigned rights for the particular participant device and the selected virtual room. In one embodiment, the selected virtual room includes a profile that describes the access rights assigned to particular profiles.

If access to the selected virtual room is restricted based on the location of the participant device associated with the profile, then the device utilized by the user is detected in Block 635. In one embodiment, the identity of the device utilized by the user is identified through a unique serial number associated with each device.

In one embodiment, the selected virtual room includes a profile that describes the devices that are allowed to access the selected virtual room. For example, in addition to restricting access to the selected virtual room based on the participant device and the corresponding profile, the selected virtual room may also limit access to the selected virtual room from other predetermined devices. In this case, if the authorized participant device through the corresponding profile attempts to access the selected virtual room through an unauthorized device, then access to the selected virtual room is denied.

In Block 640, if the participant device is authorized to access the selected virtual room, then access is allowed based on the assigned rights in the Block 645. If the participant device is not authorized to access the selected virtual room, then access is denied by the Block 625.

Figure 7:
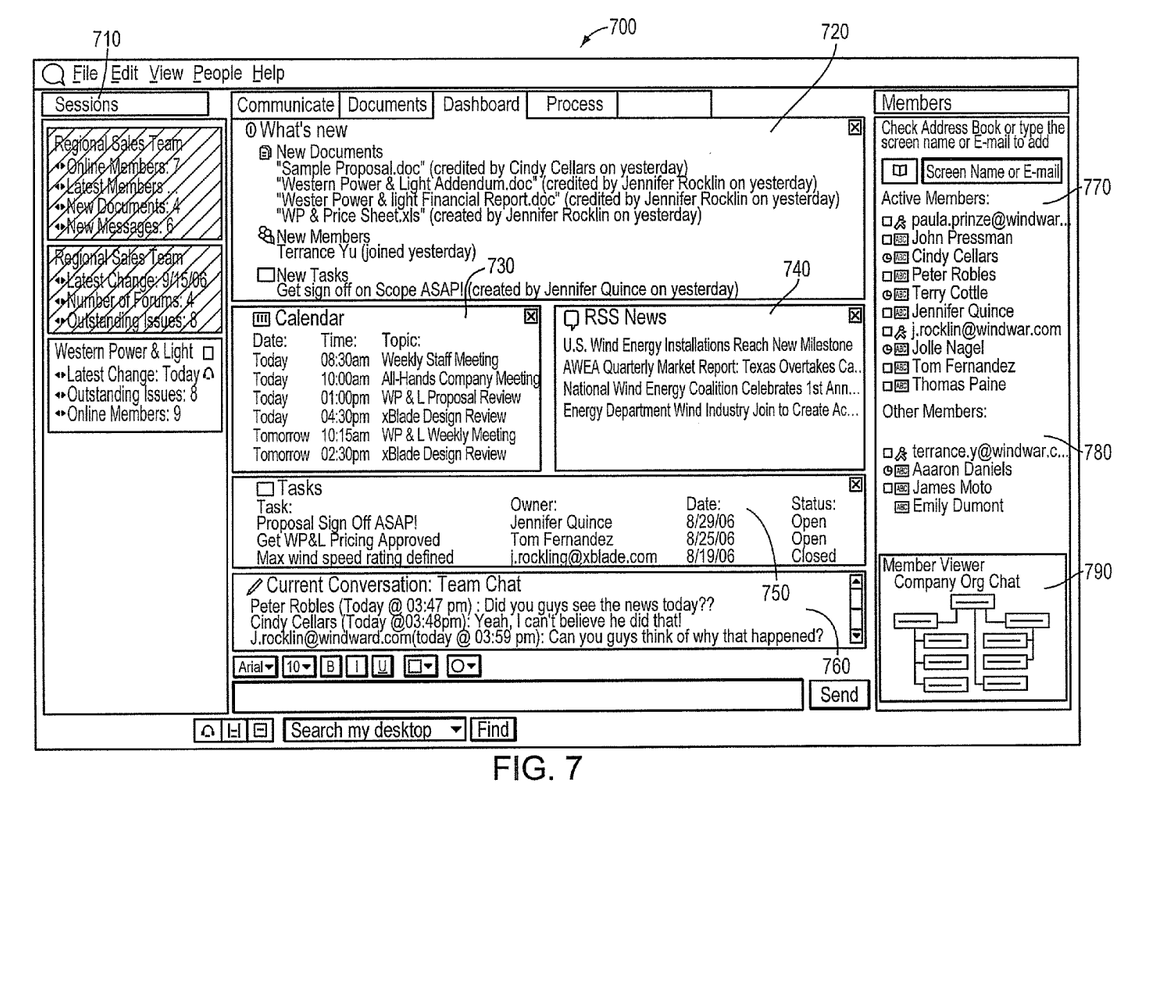
FIG. 7 is a screen shot consistent with one embodiment of the methods and apparatuses for managing resources within a virtual room.
Figure 9:
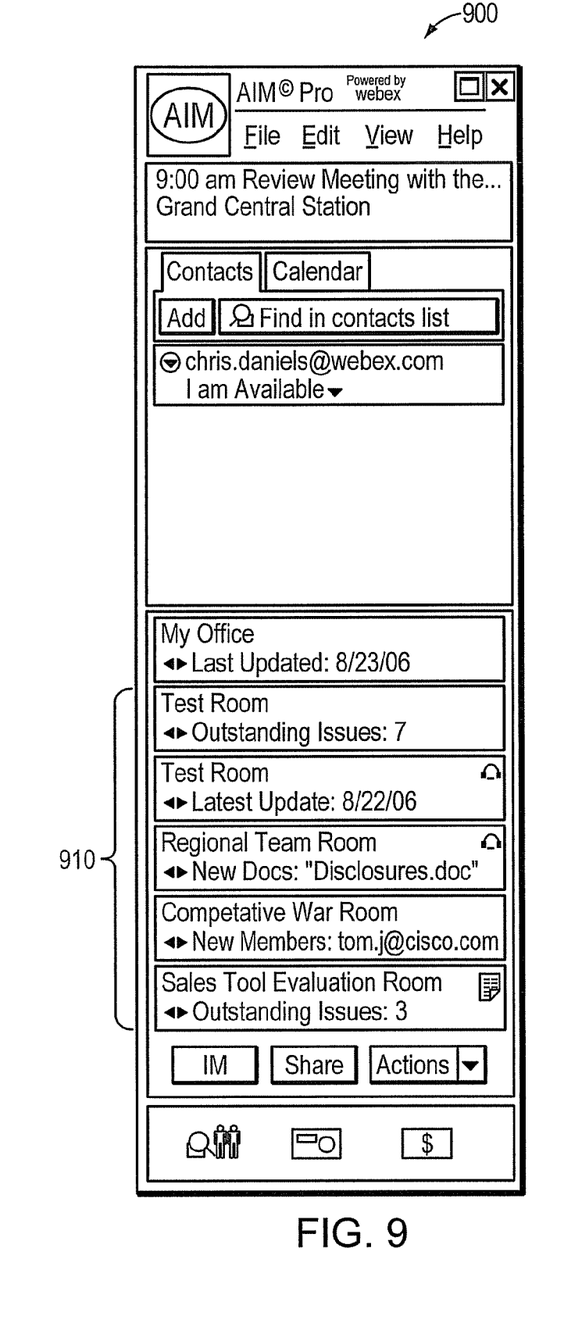
FIG. 9 is a screen shot consistent with one embodiment of the methods and apparatuses for managing resources within a virtual room.

FIGS. 7, 8, and 9 illustrate exemplary screen shots that show elements of the invention.

FIG. 7 includes a screen shot 700 having a virtual room listing 710, a new content section 720, a calendar listing 730, a news feed listing 740, a task listing 750, a conversation listing 760, an active members listing 770, a non-active members listing 780, and a hierarchy listing 790.

In one embodiment, the virtual room listing 710 displays the available virtual rooms that may be selected by the participant device. In this instance, the highlighted "Western Power and Light" virtual room is selected.

In one embodiment, the new content section 720 shows the new documents, new members, new tasks, and the like for the particular virtual room.

In one embodiment, the calendar listing 730 displays the various events that are scheduled for a particular virtual room.

In one embodiment, the task listing 750 displays the various tasks that are assigned to the participant devices belonging to a particular virtual room.

In one embodiment, the conversation listing 760 displays the messages exchanged between the participant devices belonging to a particular virtual room.

In one embodiment, the active members listing 770 illustrate participant devices that belong to the particular virtual room that are currently logged into the particular virtual room.

In one embodiment, the active members listing 780 illustrate participant devices that belong to the particular virtual room that are currently logged out of the particular virtual room.

In one embodiment, the hierarchy listing 790 shows the hierarchy between the participant devices associated with the selected virtual room. In one embodiment, the hierarchy between the participant devices is the organization chart associated with the users of the specific participant devices as organized within a company.

FIG. 8 includes a screen shot 800 having a conversation listing 810 with associated conversation threads 820 and 830. The conversation listing 810 represents various conversation threads that occur within a particular virtual room. Within the conversation listing 810, various conversation threads are organized by different threads. For example, the conversation threads 820 and 830 are grouped together because the conversation threads 820 and 830 occur within the same date. However, the conversation threads 820 and 830 are organized as distinct threads because they relate to different subject matters.

FIG. 9 includes a screen shot 900 that illustrates an instant messenger menu and includes a virtual room listing 910.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated.

What is claimed:

1. A method comprising:
   displaying a list representing a plurality of virtual rooms, wherein each virtual room of the plurality of virtual rooms is a virtual structure that includes:
      a content section that shows content associated with the virtual room;
      a news feed listing that displays news feeds associated with the virtual room;
      a conversation listing that displays messages exchange between participant devices associated with the virtual room;
      a calendar listing that displays events that are scheduled for the virtual room; and
      a task listing that displays tasks that are associated with the virtual room;
   displaying, by a participant device identified by a serial number, a visual status of each of the plurality of virtual rooms indicating whether each of the virtual rooms is available or unavailable and participant devices associated with the virtual rooms;
   receiving a selection of one of the plurality of virtual rooms and forming a selected virtual room;
   verifying that a profile associated with a user of the participant device is authorized to access the selected virtual room in response to receiving the selection by accessing a list of a plurality of authorized profiles associated with users that are allowed access to the selected virtual room;
   provided the profile associated with the user of the participant device is authorized to access the selected virtual room, determining that access to the virtual room is to be restricted based on an identity of the participant device that includes a serial number, wherein the identity of the participant device is independent from the profile associated with the user of the participant device;
   verifying that the serial number of the participant device belongs to one of a list of specific participant devices that are designated for the selected virtual room and allowed access to the selected virtual room and one of a list of controlling participant devices that have all access rights and privileges to the selected virtual room; and
   provided the serial number of the participant device belongs to the list of specific participant devices, selectively granting the participant device a type of access and control within the selected virtual room, from a plurality of different types of potential access and control, wherein the type of access and control is based on a profile associated with the selected virtual room.

2. The method according to claim 1 wherein the participant device is a computer, a telephone, a personal digital assistant, or a pager.

3. The method according to claim 1 further comprising notifying the participant device of a change of content associated with the selected virtual room.

4. The method according to claim 1 wherein the status of the participant devices is a logged in status or a logged off status.

5. The method according to claim 1 wherein selectively granting further comprises sharing content associated with the selected virtual room with the participant device associated with the selected virtual room.

6. The method according to claim 5 wherein the content associated with the selected virtual room includes a document, an image, an audio segment, a video segment, a textual segment, or a graphical representation.

7. The method according to claim 1 further comprising notifying the participant device of a meeting within the selected virtual room.

8. The method according to claim 7 wherein the meeting is an electronic collaboration session.

9. The method according to claim 7 wherein the meeting is an instant messaging session.

10. The method according to claim 1 where each virtual room of the plurality of virtual rooms is a virtual structure that also includes a hierarchy listing that displays a hierarchy between the participant devices associated with the virtual room.

11. A system comprising:
a computer system including at least one processor for:
displaying a list configured to represent a plurality of virtual rooms, wherein each virtual room of the plurality of virtual rooms is a virtual structure that includes:
a content section that shows content associated with the virtual room;
a news feed listing that displays news feeds associated with the virtual room;
a conversation listing that displays messages exchange between participant devices associated with the virtual room;
a calendar listing that displays events that are scheduled for the virtual room; and
a task listing that displays tasks that are associated with the virtual room;
displaying a visual status of each of the plurality of virtual rooms indicating whether each of the virtual rooms is available or unavailable and participant devices associated with the virtual rooms;
identifying a selected participant device identified by a serial number and associated with a selected participant that wants access to a selected virtual room from the plurality of virtual rooms;
determining that a profile corresponding to the selected participant is authorized to access the selected virtual room in response to selection of the virtual room by accessing a list of a plurality of authorized profiles that are allowed to access the selected virtual room;
determining that an identity of the selected participant device that is independent from the profile associated with the user of the participant device corresponds to an entry in a list of specific participant devices that are designated for the selected virtual room and authorized to access the selected virtual room, in response to determining that the profile corresponding to the selected participant is authorized to access the selected virtual room, wherein said identity includes a serial number;
granting a particular type of access and control within the selected virtual room to the selected participant associated with the selected participant device, wherein the particular type of access and control is based on a profile associated with the selected virtual room, the profile having a list of one of a plurality of authorized participant devices and a plurality of controlling participant devices that have all access rights and privileges to the selected virtual room and indicating a particular type of access and control for each authorized participant device and controlling participant device in the list;
selectively displaying content associated with the selected virtual room to the selected participant associated with the selected participant device; and
notifying the selected participant associated with the selected participant device of a change to the content associated with the selected virtual room.

12. The system according to claim 11 where the at least one processor further transmits a text message to the selected participant device.

13. The system according to claim 11 where the at least one processor further transmits an audio message to the selected participant device.

14. The system according to claim 11 where the at least one processor further transmits an electronic mail message to the selected participant device.

15. A method comprising:
displaying, by a participant device identified by a serial number, a virtual room listing to a user of the participant device, the virtual room listing including:
an indication of a plurality of virtual rooms;
a news feed listing that displays news feeds associated with the virtual room;
a conversation listing that displays messages exchange between participant devices associated with the virtual room;
a calendar listing that displays events that are scheduled for the virtual room; and
a task listing that displays tasks that are associated with the virtual room;
displaying a visual status of each of the plurality of virtual rooms and participant devices associated with the virtual rooms to the user of the participant device;
receiving a selection of one of the plurality of virtual rooms;
verifying that a profile associated with the user of the participant device is authorized to access the selected virtual room in response to receiving the selection by accessing a list of a plurality of authorized profiles that are allowed access to the selected virtual room;
provided the profile associated with the user of the participant device is authorized to access the selected virtual room, determining that access to the virtual room is to be restricted based on an identity of the participant device, wherein the identity of the participant device is independent from the profile associated with the user of the participant device, wherein the identity is a serial number;
verifying that the serial number of the participant device corresponds to one of an entry on a list of specific participant devices that are designated for the selected virtual room and allowed access to the selected virtual room and one of a list of controlling participant devices that have all access rights and privileges to the selected virtual room; and
provided the serial number of the participant device belongs to the list of specific participant devices, allowing a particular type of access and control within the virtual room to the user of the participant device, such that both the profile associated with the user and the participant device must be authorized to access the selected virtual room or access is denied.

16. The method according to claim 15 wherein the participant device is a computer, a telephone, a personal digital assistant, or a pager.

17. The method according to claim 15 further comprising notifying a plurality of other participant devices of a change to content associated with the selected virtual room.

18. The method according to claim 15 wherein the status of the participant devices is a logged in status or a logged off status.

19. The method according to claim 15 further comprising accessing content associated with the selected virtual room from the participant device associated with the selected virtual room.

20. The method according to claim 15 wherein content associated with the selected virtual room includes a message, a document, an image, an audio segment, a video segment, a textual segment, or a graphical representation.

21. The method according to claim 15 further comprising transmitting a meeting reminder to a plurality of participant devices that are associated with the selected virtual room.

\* \* \* \* \*